Sept. 18, 1945.  G. W. LAWSON  2,385,006
GAS TURBINE
Filed March 20, 1944
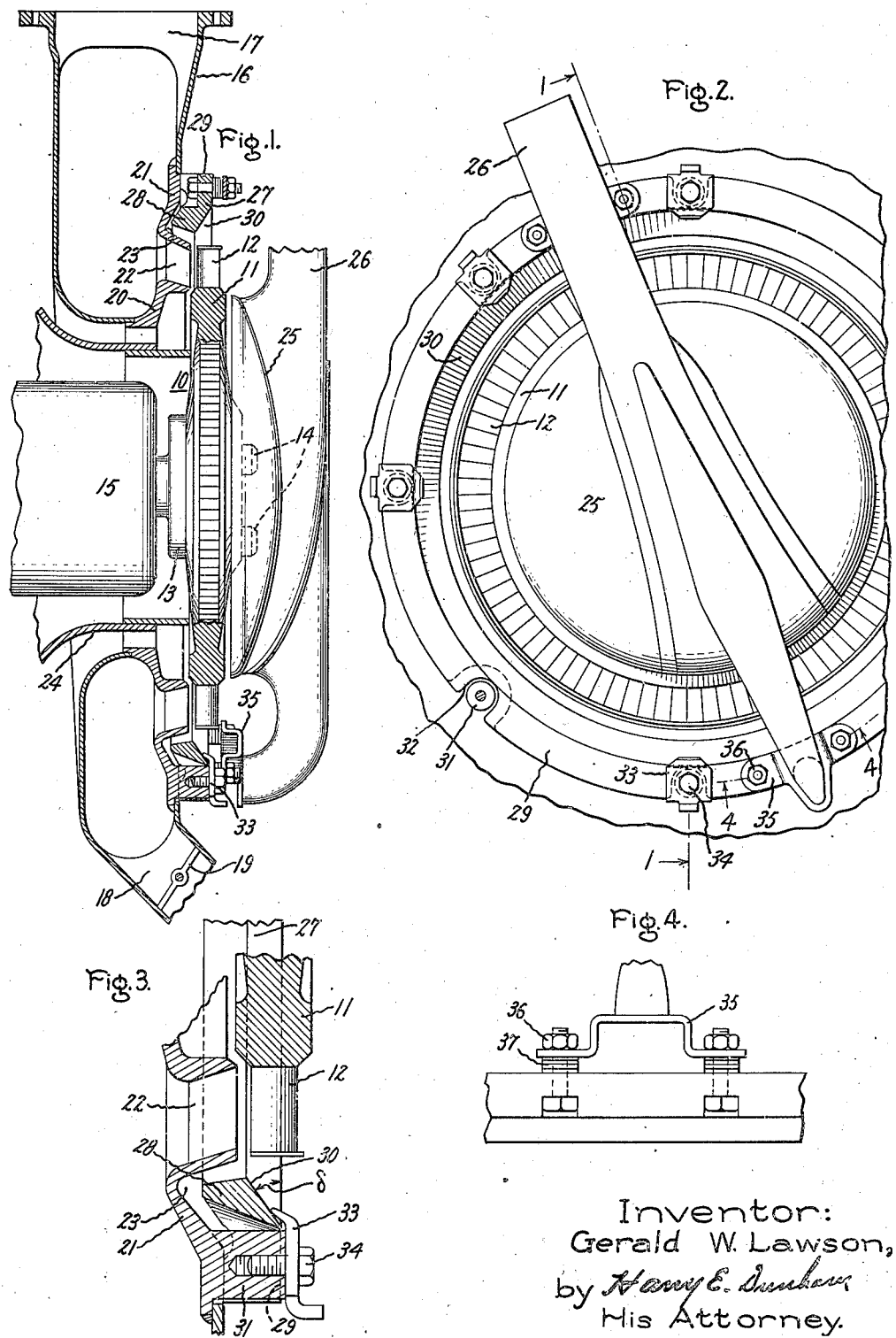
Inventor:
Gerald W. Lawson,
by Harry E. Dunbar
His Attorney.

Patented Sept. 18, 1945

2,385,006

UNITED STATES PATENT OFFICE 2,385,006

GAS TURBINE

Gerald W. Lawson, Malden, Mass., assignor to General Electric Company, a corporation of New York Application March 20, 1944, Serial No. 527,171

2 Claims. (Cl. 253—39)

The present invention relates to gas turbines and especially to gas turbines of the type used in turbosuperchargers for aircraft. Such a gas turbine comprises a turbine wheel overhung on the end of a shaft and exhausting directly to atmosphere. The turbine is usually provided with a cooling cap on the exhaust side of the wheel and the turbine may be provided also with an exhaust gas directing hood.

Such a gas turbine wheel is subjected to severe operating conditions, running at high speed and at high temperatures, and may, under unusual operating conditions, lose a fragment such as a bucket or several buckets or even a section of a wheel. When this occurs, the fragment of the wheel is thrown radially outward by centrifugal force at great speed and may damage adjacent supercharger or aircraft parts and also injure personnel in the aircraft.

The object of my invention is to provide an improved construction and arrangement of gas turbines of the type above specified whereby the injurious effects of the buckets or other fragments thrown radially outward from the wheel during operation are substantially reduced and the safety of operation of gas turbines at high temperature and speed is materially increased. This is accomplished in accordance with my invention by the provision of means associated with the bucket wheel for deflecting fragments thrown radially outward from the wheel, directing the fragments away from objects and personnel to be protected. In a preferred embodiment such means is in the form of a deflecting ring circumferentially spaced from the wheel and provided with a deflecting surface facing the wheel and having an angle of deflection to the radial direction of the wheel whereby fragments of the wheel impinging upon the deflecting surface are deflected axially away from the turbine.

For a better understanding of what I believe to be novel and my invention, attention is directed to the following description and the claims appended thereto in connection with the accompanying drawing.

In the drawing, Fig. 1 illustrates a view partly in section of a gas turbine for aircraft turbosuperchargers according to my invention; Fig. 2 is a front view of the turbine, Fig. 1 being a partial section along lines 1—1 of Fig. 2; Fig. 3 is an enlarged detail view of a part of Fig. 1; and Fig. 4 is another enlarged detail view in the direction of the arrows 4—4 of Fig. 2.

The arrangement comprises a bucket wheel 10 having a solid disk 11 with a row of buckets 12 attached to its rim. The wheel 10 is secured to a flanged, overhung portion 13 of a shaft by means of bolts 14. The shaft is supported on a bearing 15 and on the other side of the bearing the shaft may have another overhung portion for driving the impeller of a compressor, not shown. Operating medium, such as exhaust gases from an internal combustion engine, is conducted to the bucket wheel by means of a nozzle box 16 which has a flanged inlet conduit 17 for receiving gases and a waste conduit 18 with a valve 19 for discharging some of the gases directly to atmosphere. The nozzle box forms an annular channel concentrically spaced from the bearing on the inlet side of the bucket wheel 12. The box is fabricated and includes a nozzle structure having an inner ring or band 20 and an outer ring or band 21 with a plurality of circumferentially spaced portions 22 secured at their inner and outer ends to the rings 20 and 21 respectively to form a plurality of nozzle passages for conducting gas or like operating medium to the inlet side of the bucket passages formed between the buckets 12. The inner and outer rings or bands 20, 21 of the nozzle structure form parts of the nozzle box wall. The band 21 has an outer surface which forms an annular groove 23 circumferentially spaced from the bucket wheel 10. To reduce heat transfer from the nozzle box to the bearing 15, suitable annular partitions or baffle means 24 may be provided. In order to protect the disk 11 of the bucket wheel from the hot gases issuing from the bucket passages, a cooling cap 25 is provided which reduces the flow of gases discharged from the wheel towards the central portion of the disk and includes a conduit 26 for receiving cooling air, preferably from the slipstream, and directing such air towards the rim of the wheel.

The arrangement so far described is typical of present day gas turbines for turbosuperchargers, and the cooling cap arrangement is more fully disclosed in the application of C. W. Smith, Serial No. 281,562, filed June 28, 1939 and assigned to the same assignee as the present application.

As pointed out above, these turbines when operated with high temperature medium, such as exhaust gases of an internal combustion engine, at temperatures of the order of 800° C. and at speeds of the order of 20,000 R. P. M. are subject to considerable stresses during normal operating conditions. With such high stresses the slightest flaw in the bucket wheel may lead to rupture of buckets and even portions of the disk.

Fragments leaving the disk are thrown radially outward with considerable force. According to my invention I provide separate means detachably secured to the turbine for receiving such fragments and deflecting them axially away from their radial direction. In the present example, I have provided a deflecting ring 27 which has an inner portion 28 projecting into the annular groove 23 of the nozzle box and an outer portion or flange 29 seated on the wall of the nozzle box, in the present instance on an outer reinforced portion of the ring 21 of the box. The inner portion 28 of the deflector ring has a deflecting or impact surface 30 concentrically spaced from the wheel and at an acute deflecting angle δ to the radial direction. The angle δ varies with different situations. In particular instances satisfactory results have been obtained with deflecting angles of the order of about 25 degrees. It is desirable to make the angle δ as small as possible in order to reduce the impact force on and accordingly the weight of the deflecting ring. The deflecting ring is secured to the nozzle box which has a plurality of circumferentially spaced bosses 31. The outer portion 29 of the ring has a plurality of circumferentially spaced recesses or slots 32 for accommodating the boses 31 of the nozzle box. The deflecting ring is secured to said bosses by means of circumferentially spaced lugs or clamping straps 33 engaging the ring and secured to the bosses 31 by bolts 34.

The cooling cap in this arrangement is attached to the deflecting ring. To this end the cap is provided with suitable brackets 35, Fig. 4, attached to the deflecting ring by means of bolts 36 and washers or spacer means 37 for properly spacing the cap from the outlet side of the bucket wheel.

During operation, bucket fragments or other parts leaving the wheel and thrown radially outward impinge on the deflecting surface 30 of the deflecting ring and are deflected axially away from the turbine in a direction in which such fragments are not likely to harm any vital parts of the turbine or the aircraft or endanger persons on the craft. The ring is made from a material, steel or alloy, with high tensile and impact strength at elevated temperatures to which the ring is subjected during operation. It may be made from a cast alloy although in general I prefer to use a forging. By making the ring as a separate part it may be readily applied wherever needed and replaced by other rings with different deflecting angles to suit different installations. The ring is light in weight which is important in aircraft installations. The impacts to which the ring may be subjected during operation in general do no more damage to the ring than to produce minor scratches in its deflecting surface. Moreover, impacts on the ring do not produce material distortions to the nozzle box. This in part is due to the fact that the ring constitutes a separate element and impact forces thereon are likely to be distributed over a substantial portion of the nozzle box wall. The deflector ring is particularly important in arrangements in which bucket wheels supported on an overhung shaft discharge directly into the atmosphere. The ring is also important in many arrangements in which such turbines include an exhaust hood or casing because the latter ordinarily have thin walls which would not deflect fragments leaving the wheel in radial direction. Such light walls would be readily pierced by the fragments without materially reducing their inertia. Also, the requirements for light weight of all parts used on aircraft would not permit the provision of an exhaust hood of sufficient strength and thickness materially to reduce the dangers from flying fragments of the bucket wheel.

Thus with my invention I provide a simple, effective and efficient arrangement for deflecting fragments from a bucket wheel operated at high temperature and high speed to increase materially the safety of operation of such turbines.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. An aircraft gas turbine comprising a bucket wheel, a shaft rotatably supporting the wheel, a nozzle box located on one side of the wheel for conducting gases thereto, said box having a wall forming an annular groove concentrically spaced from the wheel, and a deflector ring supported on said wall and projecting into the groove, said ring having an annular deflecting surface at an acute angle to the radii of the wheel for axially deflecting fragments radially thrown from the wheel.

2. An aircraft gas turbine comprising a bucket wheel, a shaft rotatably supporting the wheel, a nozzle box located on one side of the wheel for conducting gases thereto, said box having a wall forming an annular groove concentrically spaced from the wheel, and a deflector ring having a portion projecting into the groove and another portion seated on the wall and secured thereto, the first mentioned portion having an annular deflecting surface at an acute angle to the radii of the wheel for axially deflecting fragments radially thrown from the wheel.

GERALD W. LAWSON.